(12) United States Patent
Quigley

(10) Patent No.: US 7,136,324 B1
(45) Date of Patent: Nov. 14, 2006

(54) PRESSURE EQUALIZING FLUIDBORNE SOUND PROJECTOR

(75) Inventor: James M. Quigley, Philadelphia, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 184 days.

(21) Appl. No.: 10/975,111

(22) Filed: Oct. 28, 2004

(51) Int. Cl.
*G01V 1/137* (2006.01)

(52) U.S. Cl. ..................... 367/143; 367/167

(58) Field of Classification Search ............ 367/143, 367/167; 116/137 R, 142 FP
See application file for complete search history.

(56) References Cited

U.S. PATENT DOCUMENTS

| | | | |
|---|---|---|---|
| 3,403,374 A * | 9/1968 | Mellen et al. | ............... 367/143 |
| 4,030,063 A | 6/1977 | Wallen | |
| 4,047,148 A | 9/1977 | Hagemann | |
| 4,483,411 A | 11/1984 | Mifsud | |
| 6,320,281 B1 | 11/2001 | Zakharian | |
| 6,320,821 B1 | 11/2001 | Goldring et al. | |

* cited by examiner

*Primary Examiner*—Dan Pihulic
(74) *Attorney, Agent, or Firm*—Jacob Shuster

(57) ABSTRACT

A solid metallic piston of a fluidborne sound projector is provided with a plurality of parallel spaced fluid passages extending between opposite axial end faces of the piston so as to equalize fluid pressures exerted thereon within a chamber enclosed within an end portion of a conduit having an end wall attached thereto through which a solid piston rod extends from the piston to an acoustical power source from which acoustical energy is mechanically transmitted as displacing forces applied to one of the axial end faces of the piston. Displacement of the piston within the chamber is limited in one axial direction by abutment of the rear end face thereof with the conduit end wall and in the other axial direction by abutment of a larger diameter section of the piston with a forward stop on an annular seal fixed to the conduit end portion, through which a smaller diameter section of the piston extends from the larger diameter section.

10 Claims, 2 Drawing Sheets

PRESSURE EQUALIZING FLUIDBORNE SOUND PROJECTOR

The present invention relates to self-equalization of pressures within a fluidborne sound projector.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Fluidborne projectors for delivery of sound to fluid filled piping systems is already well known in the art as disclosed for example in U.S. Pat. No. 6,320,821 to Goldring et al. Such fluidborne sound projectors make use of an electro-mechanical shaker as a source of sound applied to one axial end of a piston within a conduit chamber through a piston rod connected to the piston to excite fluid within a piping system to which the conduit is connected. A series of pressure equalization tanks were heretofore associated with such a fluidborne sound projector to maintain the piston in a neutral position within the conduit chamber by means of pressurized air supplied thereto through top openings in the chamber conduit. Reliance on such use of pressurized air tanks and the expenses associated therewith resulted in relatively high costs. It is therefore an important object of the present invention to reduce costs by eliminating use of such pressure equalization tanks and the complexities associated therewith.

SUMMARY OF THE INVENTION

Pursuant to the present invention, a fluidborne sound projector is associated with an electro-mechanical shaker from which acoustic sound forces are applied through a solid piston rod extending from one axial end of a piston within a fluid chamber. The solid piston rod extends through a bushing seal in a back-stop end wall of the chamber attached to an axial end portion of an elongated conduit of a piping system to which acoustical energy is to be translated. An annular seal stop is fixedly positioned within the chamber in axially spaced relation to the chamber end wall for engagement by an annular abutment surface formed between large and small diameter sections of the piston to limit axial displacement of the piston in one direction opposite to the direction in which piston displacement is limited by abutment of the the large diameter piston section with the conduit end wall. A plurality of pressure equalizing fluid passage holes are formed in the piston extending between rear and forward end faces of the piston respectively formed on the large and small diameter end sections thereof. High fluid pressures within the conduit chamber are thereby internally neutralized.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

Figure 2:
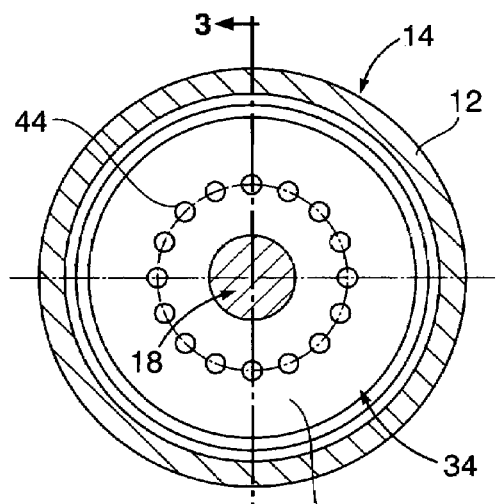
FIG. 2 is a transverse section view taken substantially through a plane indicated by section line 2—2 in FIG. 1.
Figure 3:
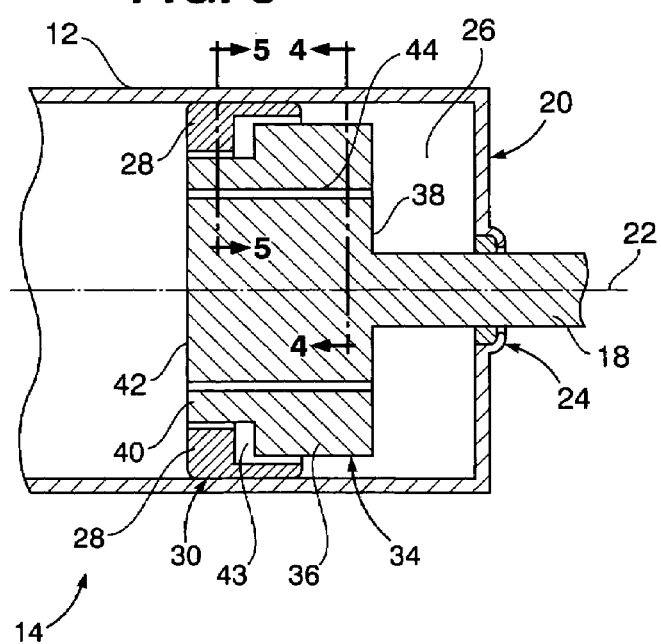
Figure 4:
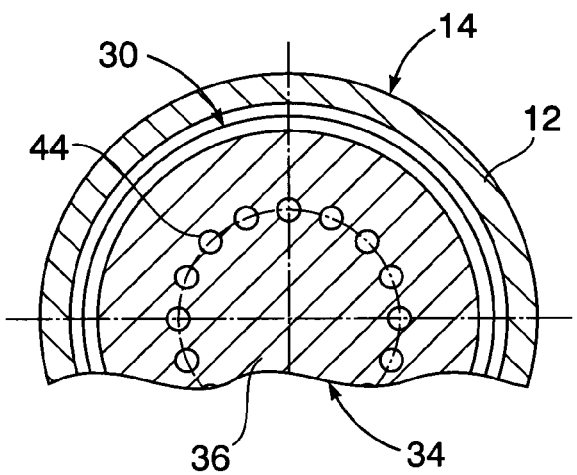
Figure 5:
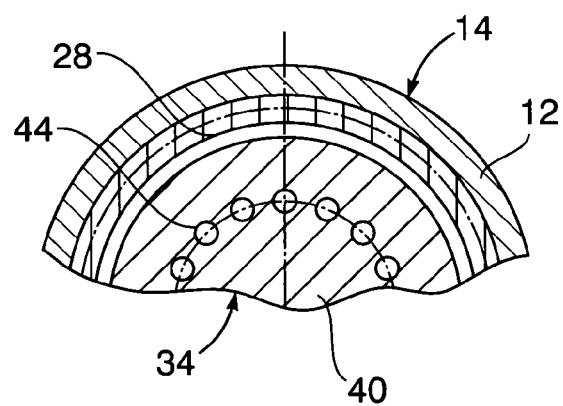

FIG. 3 is a partial section view taken substantially through a plane indicated by section line 3—3 in FIG. 2; and FIGS. 4 and 5 are partial section views, taken substantially through planes indicated by section lines 4—4 and 5—5 in FIG. 3.

DETAILED DESCRIPTION OF PREFERRED EMBODIMENT

Figure 1:
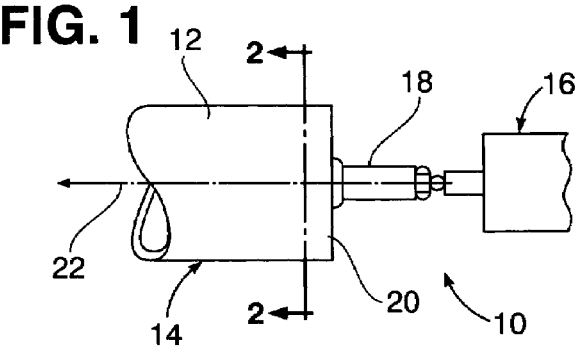
FIG. 1 is a side elevation view of an acoustic projector arranged, within a fluidborne noise generating system pursuant to the present invention.

Referring now to the drawing in detail, FIG. 1 illustrates a fluidborne noise generating acoustic projector 10 formed within an axial end portion 12 of an elongated conduit 14 associated with a piping system into which acoustical sound energy is to be translated from an external sound source, such as an electro-mechanical shaker 16. One end of the conduit 14 is closed by an end wall 20 from which a solid piston rod 18 of the fluidborne projector 10 extends for engagement by the shaker 16 to impart displacement thereof along an axis 22 of the fluidborne projector 10.

As shown in FIGS. 2 and 3, the solid piston rod 18 extends through a seal bushing 24 in the end wall 20 of the conduit 14 into a cylindrical chamber 26 enclosed within the axial end portion 12 of the conduit 14. A forward stop 28 projects radially inwardly from an annular seal 30 internally fixed to the conduit end portion 12 in axially spaced relation to the end wall 20. The solid piston rod 18, made from metal for example, is formed integral with a cylindrical piston 34, having a larger diameter section 36 and a smaller diameter section 40. The piston rod 18 extends from an end face 38 of the larger diameter section 36 of the piston 34. A smaller diameter section 40 of the piston 34 extends axially from the larger diameter section 36 to an opposite end face 42 as shown in FIG. 3. An annular abutment surface 43 is thereby established on the piston 34 between the larger and smaller piston diameter sections 36 and 40 thereof for engagement with the seal stop 28 to limit axial displacement of the piston 34 under axial forces applied thereto in one axial direction. Axial displacement of the piston 34 in the opposite axial direction is limited by abutment of the piston end face 38 with the end wall 20.

As shown in FIGS. 2–5, fluid pressure within the chamber 26 applied to the opposite end faces 38 and 42 of the piston 34 are equalized during axial piston displacement by fluid flow through a plurality of hole passages 44 extending in parallel spaced relation to each other through the piston 34 between the rear and forward end faces 38 and 42. Pressure equalization is accordingly achieved pursuant to the present invention by use of the passage holes 44 in the foregoing described arrangement of the acoustic projector 10 with use of a solid piston rod 18, a diametrically sectioned piston 34 and a seal mounted stop 28 limiting piston displacement in one axial direction.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a cylindrical conduit having an axial end wall attached thereto enclosing a fluid chamber, a fluidborne acoustic projector comprising: a piston within said fluid chamber undergoing axial displacement therein in response to external forces applied thereto; a piston rod extending into the chamber through the end wall and attached to the piston through which the axial displacement is imparted thereto; and means for equalizing fluid pressures respectively exerted on opposite axial end faces of the piston internally within the fluid chamber during said axial displacement of the piston, wherein said means for equalizing the fluid pressures comprises a plurality of fluid passages formed within the piston extending between said opposite axial end faces thereof.

2. The combination as defined in claim 1, wherein the piston rod is attached to one of the opposite axial end faces of the piston.

3. The combination as defined in claim 2, wherein said axial displacement of the piston is limited by abutment with a back-up stop surface on the end wall and a forward stop projecting from a piston seal fixed within the chamber.

4. The combination as defined in claim 3, wherein the piston has a diametrically larger section engageable by the forward stop on the piston seal, one of the opposite axial end faces being formed on the diametrically larger section of the piston so as to abut the back-up surface on the end wall.

5. In combination with a cylindrical conduit having an axial end wall attached thereto enclosing a fluid chamber, a fluidborne acoustic projector comprising: a piston within said fluid chamber undergoing axial displacement therein in response to external forces applied thereto; a piston rod extending into the chamber through the end wall and attached to the piston through which the axial displacement is imparted thereto; and means for equalizing fluid pressures respectively exerted on opposite axial end faces of the piston internally within the fluid chamber during said axial displacement of the piston, wherein said axial displacement of the piston is limited by abutment with a back-up stop on the end wall and a forward stop on a piston seal fixed within the chamber.

6. The combination as defined in claim 5, wherein the piston has a diametrically larger section which abuts the forward stop on the piston seal; one of the opposite piston axial end faces being formed on the diametrically larger section of the piston so as to abut the back-up surface on the end wall.

7. The combination as defined in claim 6, wherein said means for internally equalizing the fluid pressures comprises: a plurality of fluid passages extending through the diametrically larger and smaller sections of the piston between the opposite axial end faces.

8. In combination with a device for projecting sound into a body of liquid exerting pressures on opposite axial end faces of a piston within a chamber; an acoustical power source which imparts displacement to the piston within the chamber under pressures of the liquid on said opposite end faces thereof; neutralizing means for internally equalizing the pressures within the chamber respectively exerted on said opposite axial end faces of the piston, and stop means fixedly positioned within the chamber means for limiting the displacement imparted in opposite directions to the piston, wherein said neutralizing means comprises a plurality of angularly spaced passages extending through the piston between said opposite end faces thereof.

9. The combination as defined in claim 6, wherein said piston has diametrically larger and smaller sections forming an annular abutment surface engaged by the stop means to limit said displacement of the piston in one axial direction.

10. The combination as defined in claim 9, wherein a solid piston rod extends from the diametrically larger section of the piston through an end wall of the chamber to the acoustical power source.

* * * * *